Figure 8:
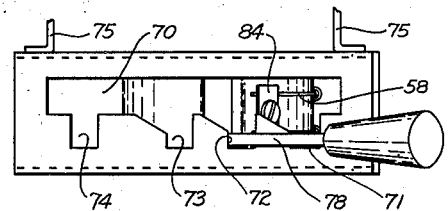

May 6, 1941.　　W. H. DESAULNIERS ET AL　　2,240,984
DIRECTION INDICATOR
Filed Sept. 10, 1938　　2 Sheets-Sheet 1
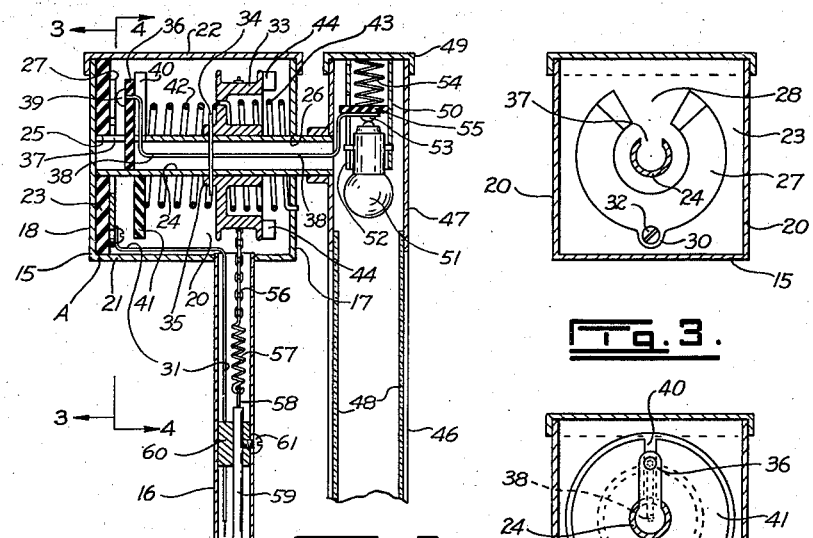
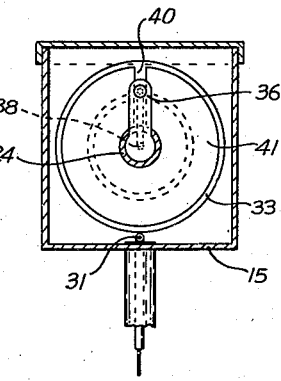
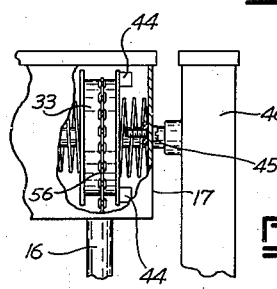
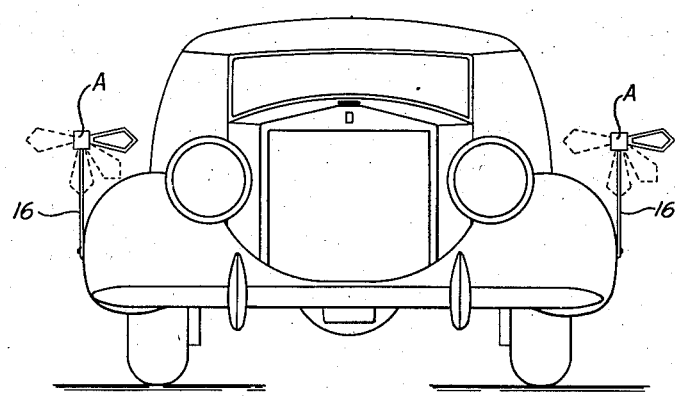
INVENTORS
Wilfred Hilaire Desaulniers
and
Bernard Joseph Desaulniers
BY
ATTORNEY May 6, 1941.  W. H. DESAULNIERS ET AL  2,240,984
DIRECTION INDICATOR
Filed Sept. 10, 1938  2 Sheets-Sheet 2

INVENTORS
Wilfred Hilaire Desaulniers
and
Bernard Joseph Desaulniers
BY
Stevens
ATTORNEY Patented May 6, 1941

2,240,984

UNITED STATES PATENT OFFICE 2,240,984

DIRECTION INDICATOR

Wilfred Hilaire Desaulniers and Bernard Joseph Desaulniers, Vancouver, British Columbia, Canada Application September 10, 1938, Serial No. 229,382
In Canada September 13, 1937

3 Claims. (Cl. 177—327)

This invention relates to a direction indicator for vehicles, particularly automobiles and trucks.

An object of the present invention is the provision of a direction indicator capable of indicating, simultaneously on both sides of a vehicle, left or right hand turns or a caution signal.

Another object is the provision of a direction indicator that may be mounted on a vehicle so as to be clearly discernible to drivers of other vehicles, the driver of the vehicle on which it is mounted and pedestrians.

A further object is the provision of a direction indicator of simple construction which may be very easily dismantled for repair or replacement of parts.

A still further object is the provision of a direction indicator adapted to be mounted on the vehicle away from the body thereof so that it may be made comparatively smaller without reducing its efficiency.

This direction indicator comprises a pair of signal elements adapted to be mounted on each side of the forward end of a vehicle and an operating mechanism situated adjacent the driver of the vehicle. In the case of an automobile or truck, the signal elements could be mounted on the front fenders and the operating mechanism on the steering column.

The advantages of this direction indicator are many. The signal elements on each side of the vehicle simultaneously indicate the same signal so that they may be seen by the drivers of other vehicles or pedestrians no matter where they may be in relation to the vehicle in question. When the driver of a vehicle signals a turn, say, for example, a left turn, the vehicle behind could immediately start to pass on the right. The driver of the latter vehicle would not lose sight of the signal so that he would at all times be certain of the intention of the driver of the first vehicle and should the latter change his mind, the change would be made apparent by the next signal.

By mounting the signal elements on the outer edges of the front fenders of an automobile or truck, they are set out clear of the body of the car where they are readily discernible. In this way, the signal elements can be made smaller than usual with the consequent reduction in cost of manufacture and, at the same time, a smaller light bulb may be used thus reducing the drain on the battery without lessening the efficiency of the indicator. The signal elements, which also act as fender guides, are in full view of the driver so that he would know at all times whether or not they were functioning properly and yet they would not obstruct his view.

The signals are quite clear and easily understood by everyone since the signal elements each have an arm adapted to point to the right for a right turn, to the left for a left turn and to assume a position mid-way between the left turn and neutral position to indicate a caution signal. If desired, the arms of the signal elements may be swung back and forth between the right and left turn positions to indicate a U turn. In this way, the arms act in the same manner as a lantern being swung back and forth so that a person seeing the signal would naturally be cautious even if he did not fully understand it.

Figure 9:
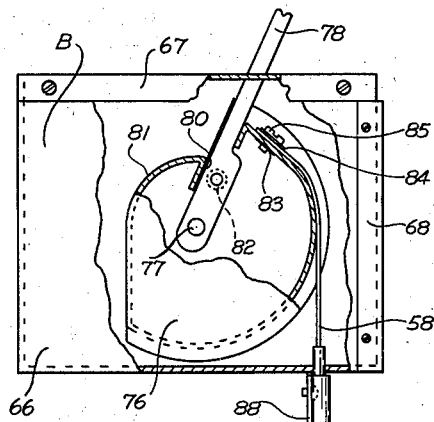
Figure 10:
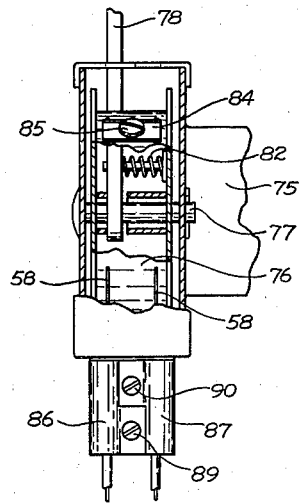
Figure 6:
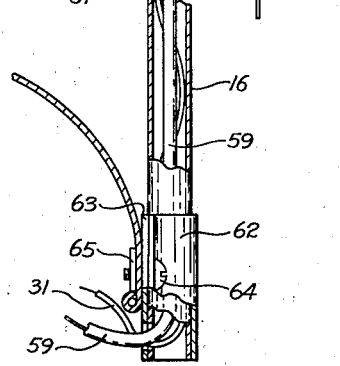
Figure 7:
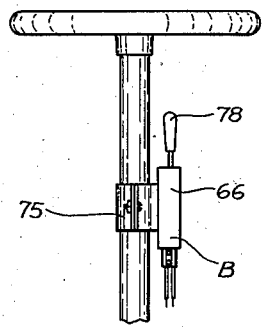

In the accompanying drawings:

Figure 1 is a front elevation of an automobile with the direction indicator mounted thereon, said indicator signaling a left turn, Figure 2 is a vertical sectional view through a signal element, Figure 3 is a sectional view taken on the line 3—3 of Figure 2, Figure 4 is a sectional view taken on the line 4—4 of Figure 2, Figure 5 is a side elevation of a signal element with part of the casing broken away to show the interior thereof, Figure 6 is a fragmentary detail view of the means for mounting a signal element on a fender, Figure 7 is a side elevation of the operating mechanism mounted on a steering column, Figure 8 is a plan view of the operating mechanism, Figure 9 is a side elevation of the operating mechanism with certain parts broken away to show the interior thereof, and Figure 10 is an end elevation of the operating mechanism with certain parts broken away to show the interior thereof.

Referring more particularly to the drawings, the direction indicator comprises a pair of signal elements A mounted on each side of the forward end of the vehicle and an operating mechanism B mounted adjacent the driver of the vehicle. In the case of an automobile or truck, the signal elements A are preferably mounted on the outer edges of the front fenders, as shown in Figure 1, and the operating mechanism is preferably mounted on the steering column of the automobile or truck, as shown in Figure 7.

Both of the signal elements A are constructed in the same manner so that only one need be described. This signal element comprises a casing 15 mounted on the upper end of a hollow standard 16, with the interior of said standard communicating with the interior of the casing. The casing is formed with end walls 17 and 18, side walls 20, a bottom 21 and a removable cover 22. A panel 23, formed of insulating material, rests on the bottom and abuts against the inner surface of the wall 18. A hollow shaft 24, having its inner end journalled in an orifice 25 in the panel 23, extends longitudinally and centrally of the casing 15 through an orifice 26 in the end wall 17 and projects beyond said wall.

An arcuate contact plate 27 is mounted on the panel 23 with a space 28 between its free ends, said plate having a lug 30 formed therewith against which the end of an insulated wire 31 is held by a screw 32. The wire 31 extends along the bottom of the casing and down through the standard 16.

A substantially hollow drum 33, shaped as shown in Figure 2, is mounted on the shaft 24. A pin 34 extending through a collar 35 of the drum, and the shaft, fixes the former to the latter. An arm 36, formed of insulating material, extends upwardly from within the shaft 24 through a slot 37 formed adjacent the inner end of said shaft, said arm being adapted to carry adjacent its outward end the end of an electric conductor or wire 38 having a contact 39. The wire 38 extends downwardly through a slot 40 formed in an insulating disc 41 which is slidably mounted on the shaft 24. This wire then passes through the slot 37 into the shaft 24 along which it extends towards the outer end of said shaft. The arm 36 is wider than the slot 40 of the disc 41 and, therefore, overlaps said slot. One end of a coil spring 42 bears against the drum 33 and the other end bears against the disc 41 so that said spring urges the disc, the arm 36 and the contact 39, along the shaft 24 towards the panel 23. In this way, the contact 39 is normally urged into the space 28 between the ends of the arcuate plate 27 and when the shaft 24 is rotated in either direction, the contact is urged into engagement with said arcuate plate. A coil spring 43, encircling the shaft 24, has one end anchored in the wall of the drum 33 and the other end anchored in the end wall 17 of the casing 15. Lugs 44 formed on the drum 33 diametrically opposite each other, are adapted to engage a stop, such as a bolt 45, (see Fig. 5), secured to the end wall 17 of the casing, when the drum is rotated in either direction through approximately one quarter turn.

An indicator arm 46 is formed with or fixedly mounted on the outer end of the shaft 24. The indicator arm comprises a casing 47 formed with openings in its two faces, said openings being covered by sheets 48 of coloured, translucent material. The casing 47 is provided at one end with a removable cover 49, having a socket 50 adapted to extend into the casing, and a light bulb 51 is removably mounted in said socket. The electric wire 38 extends along the shaft 24 into the casing 47 and into the socket 50 through a slot 52 formed therein. A contact 53, formed on the outer end of the wire 38, is pressed against the contact of the light bulb by a spring 54 which lies in the socket 50 between the cover 49 and a layer of insulating material 55, said insulating material bearing against the contact 53. The light bulb 51 is covered by the sides of the casing 47 in order to prevent glare at one particular point in the indicator arm.

A chain 56 anchored to and extending around the drum 33, extends downwardly into the standard 16 and the upper end of a coil spring 57 is secured to the free end thereof. A cable 58 having one end secured to the lower end of the spring 57, extends downwardly into a cable housing 59 which extends to the operating mechanism B. The end of the housing 59 is secured to a sleeve 60 in any suitable manner, such as by soldering, which sleeve is removably anchored in the standard 16 by a screw 61. The sleeve 60 is provided with a passageway through which the insulated wire 31 may pass, the opposite end of said wire being connected to a fused circuit in the vehicle.

The standard 16 which may be of any desired length, is secured to the fender of the automobile or truck by a clamp 62. This clamp presses the standard against a plate 63 which, in turn, bears against the edge of the fender. This assembly is held together by bolts 64 which pass through the clamp, plate and fender and screw into a plate 65. The cable housing 59 and the electric conductor 31 pass through elongated openings in the standard 16 and the plate 63 whence they extend into a tube, not shown, leading into the vehicle.

The operating mechanism B comprises a casing 66 having a removable cover 67 and a removable end cover 68. The cover 67 is formed with an elongated slot 70 having in one side thereof recesses 71, 72, 73 and 74. The casing 66 is adapted to be mounted on the steering column of the automobile by means of a bracket 75.

A hollow drum 76 is freely mounted on a shaft 77 located centrally of the casing 66. A handle 78, freely mounted on the shaft 77, extends outwardly therefrom through an opening 80, formed in the periphery 81 of the drum, and through the slot 70 of the cover 67. A spring 82 holds the handle 78 against one side of the drum, and, consequently, tends to urge said handle into one of the recesses of the plate 70. The cables 58, there being two of them since there are two signal elements A, are secured to the periphery of the drum at 83 by a plate 84 which is clamped to the drum by a screw 85. The cable housings 59 are held by clamps 86 and 87, which, in turn, are secured to a lug 88 depending downwardly from the bottom of the casing 66, by screws 89 and 90. These screws not only secure the clamps to the lug 88 but they tighten the clamps about the cable housings.

As stated above, there is a cable 58 extending from the drum 76 of the operating mechanism B, to the spring 57 and chain 56 of the drum 33 of each of the signal elements A with the result that the drums 33 are rotated when the drum 76 is rotated, the tension of the springs 57 being sufficient to permit this. The action of only one signal element will now be described, it being understood that the other signal element is synchronized with the one described.

The indicator arm 46 normally remains in a vertical position pointing downwardly, this position being neutral. The arm is capable of being swung to the right into a horizontal position to indicate a right turn, or to the left to a position substantially midway between the vertical and the horizontal, to indicate a caution signal and further to the left into a horizontal position to indicate a left turn. The arm is lighted as soon as it moves in either direction out of the neutral position.

The spring 43 tends to rotate the drum 33, and, consequently the indicating arm 46 to the left, into the left turn position, so that when the arm is moved into any of the other positions, the drum 33 is rotated against the tension of said spring.

The recess 71 corresponds to the left turn position, the recess 72 to the caution position, the recess 73 to the neutral position, and the recess 74 to the right turn position. When it is desired to signal a left turn, the handle 78 is moved into recess 71 thus allowing the spring 43 to rotate the drum 33 to move the indicator arm into the left turn position. During this time, the shaft 24 rotates with the drum 33 so that the contact 39 is moved from the space 28 into engagement with the arcuate contact plate 27. This closes the circuit and lights the bulb 51 which is grounded to the socket 50. In order to move the signal from the left turn position to the caution position, the handle 78 is moved into recess 72. This movement rotates the drum 76, which movement is transferred to the drum 33 through the cable 58 so that said drum 33 is rotated against the tension of spring 43 to move the indicator arm into the caution position. During this movement the contact 39 remains in engagement with the arcuate plate 27 and the bulb 51 remains lighted.

When it is desired to move the signal into the neutral or right turn positions, the handle is moved into recess 73 or recess 74. This movement further rotates the drum 33 against the tension of spring 43 to move the indicator arm into the neutral or right positions. From this it will be seen that the spring 43 will move the indicator arm from the right turn position into neutral or any other signal position when the handle 78 is moved into the desired recess. When the arm reaches the left or right turn positions, the lugs 44 of the drum 33 engage the bolt 45 secured to the end wall 17, to prevent the indicator arm from moving past the horizontal position should there be any slack in the cable 58. Here again, as soon as the arm leaves the neutral position, the contact 39 is moved out of the space 28 into engagement with the arcuate contact plate 27 to close the circuit and light the bulb 51.

If desired, the handle 78 may be moved back and forth from one end to the other of the slot 70 to swing the indicator arm back and forth between the right and left turn positions. This will indicate a U turn and even if the signal is not understood, it will serve as a warning that the driver intends to do something out of the ordinary particularly since the bulb will be flashing on and off as the contact 39 passes over the space 28 between the ends of the arcuate contact plate 27.

The setting of the indicator arms may be adjusted and synchronized by lengthening or shortening the cables 58. This may be done by removing the end cover 68 of the casing 66 and loosening the screw 85 to release the plate 84. Any slight adjustment may be made by lengthening or shortening the cable housings 59 at the clamps 86 and 87. This adjustment of the cable housings tend to take up any or create slack therein between the signal elements and the operating mechanism thus slightly altering the positions of the indicator arms.

The signal elements may very easily be dismantled by removing the pin 34 from the collar 35 of the drum 33 and withdrawing the shaft 24 from the casing 15. The disc 41 and the springs 42 and 43 will remain in the casing 15. The arm 36 may be folded down within the shaft 24 in order to draw the wire 38 through said shaft. The socket 50 is removed from the indicator arm by removing the cover 49.

The chain 56 winds around the drum 33 and will stand continual flexing at this point without injury thereto and it permits the drum to be easily rotated by the spring 43. With direction indicators of this type, there is always the danger of someone moving the indicator arms into their various positions by means of the arms themselves. If either indicator arm is moved to the right turn position in this manner, the cable 58 merely becomes slack but if either of the arms is moved to the left turn position, the coil spring 57 stretches to absorb this movement thus saving the cable 58 from being stretched or broken. This prevents the direction indicator from being pulled out of adjustment by anyone tampering with it.

From the above it will readily be seen that a direction indicator has been provided which is capable of indicating simultaneously on both sides of a vehicle left or right turns or a caution signal, and which is clearly discernible to drivers of other vehicles, the driver of the vehicle on which it is mounted, and pedestrians.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What we claim as our invention is:

1. A direction indicator for a vehicle including in combination a signal element comprising a casing mounted on a standard secured to the vehicle, a hollow shaft extending longitudinally of and beyond the casing, an indicator arm fixed to the outer end of the shaft, said arm normally resting in a neutral position, means for rotating the shaft and indicator arm into different signal positions, means for returning the arm to its neutral position, an insulated arm extending outwardly from within the hollow shaft through a slot formed therein, said arm being adapted to carry adjacent its outer end the end of an electric conductor, a contact formed on the end of the conductor, said conductor extending into and along the hollow shaft into the indicator arm and being connected to illuminating means in said arm, an arcuate contact plate mounted in the casing having a space between its free ends, said contact plate being connected to a circuit in the vehicle, and means for urging the insulated arm and the contact of the conductor along the shaft to bring the contact into engagement with the arcuate plate when the indicator arm is moved into any signal position to illuminate the latter.

2. A direction indicator for a vehicle including in combination a signal element comprising a casing mounted on a standard secured to the vehicle, a hollow shaft extending longitudinally of and beyond the casing, an indicator arm fixed to the outer end of the shaft, said arm normally resting in a neutral position, means for rotating the shaft and indicator arm into different signal positions, means for returning the arm to its neutral position, an insulated arm extending outwardly from within the hollow shaft through a slot formed therein, said arm being adapted to carry adjacent its outer end the end of an electric conductor, an insulating disc slidably mounted on the shaft, said disc having a radial slot formed therein, a contact formed on the end of the conductor, said conductor extending downwardly through the slot of the disc into and along the hollow shaft into the indicator arm and being connected to illuminating means in said arm, an arcuate contact plate mounted on an insulated panel in the casing and having a space between its free ends, said contact plate being connected to a circuit in the vehicle, and spring means for urging the insulated arm and the contact of the conductor along the shaft to bring the contact into engagement with the arcuate plate when the indicator arm is moved into any signal position to illuminate the latter.

3. A direction indicator for a vehicle including in combination a signal element comprising a casing mounted on a standard secured to the vehicle, a hollow shaft extending longitudinally of and beyond the casing, an indicator arm fixed adjacent one end thereof to the outer end of the shaft normally resting in a neutral position, said arm having openings therein spaced from its inner end covered by sheets of translucent material, means for rotating the shaft and indicator arm into different signal positions, means for returning the arm to its neutral position, an insulated arm extending outwardly from within the hollow shaft through a slot formed therein, said arm being adapted to carry adjacent its outer end the end of an electric conductor, a contact formed on the end of the conductor, said conductor extending into and along the hollow shaft into the indicator arm and being connected to illuminating means in said arm at its inner end, an arcuate plate mounted in the casing having a space between its free ends, said contact plate being connected to a circuit in the vehicle, and means for urging the insulated arm and the contact of the conductor along the shaft to bring the contact into engagement with the arcuate plate when the indicator arm is moved into any signal position to illuminate the latter.

WILFRED HILAIRE DESAULNIERS.
BERNARD JOSEPH DESAULNIERS.